United States Patent
An

(10) Patent No.: US 9,997,292 B2
(45) Date of Patent: Jun. 12, 2018

(54) WIRELESS POWER TRANSMITTER AND WIRELESS POWER RECEIVER

(75) Inventor: Jeong Wook An, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 771 days.

(21) Appl. No.: 14/235,318

(22) PCT Filed: Jul. 9, 2012

(86) PCT No.: PCT/KR2012/005419
§ 371 (c)(1),
(2), (4) Date: Jan. 27, 2014

(87) PCT Pub. No.: WO2013/015540
PCT Pub. Date: Jan. 31, 2013

(65) Prior Publication Data
US 2014/0145518 A1    May 29, 2014

(30) Foreign Application Priority Data

Jul. 26, 2011 (KR) .................. 10-2011-0074272
Aug. 17, 2011 (KR) .................. 10-2011-0081516

(51) Int. Cl.
*H01F 38/00* (2006.01)
*H01F 38/14* (2006.01)
(Continued)

(52) U.S. Cl.
CPC .............. *H01F 38/14* (2013.01); *H01F 27/36* (2013.01); *H02J 5/005* (2013.01); *H02J 7/025* (2013.01);
(Continued)

(58) Field of Classification Search
USPC ........................................................ 307/104
See application file for complete search history.

(56) References Cited

U.S. PATENT DOCUMENTS

| 5,808,537 A | 9/1998 | Kondo et al. |
| 2009/0058358 A1 | 3/2009 | Inoue et al. |

(Continued)

FOREIGN PATENT DOCUMENTS

| CN | 101958597 A | 1/2011 |
| EP | 2172952 A1 | 4/2010 |

(Continued)

OTHER PUBLICATIONS

Office Action dated May 19, 2016 in Chinese Application No. 201280044946.7.

(Continued)

*Primary Examiner* — Rexford Barnie
*Assistant Examiner* — Dru Parries
(74) *Attorney, Agent, or Firm* — Saliwanchik, Lloyd & Eisenschenk

(57) ABSTRACT

A wireless power receiver for wirelessly receiving power from a wireless power transmitter according to the embodiment includes a reception coil part resonance-coupled with the wireless power transmitter to receive the power, and an eddy current prevention part disposed at one side of the reception coil part to prevent an eddy current from being generated from the wireless power receiver caused by a magnetic field generated from the reception coil part.

6 Claims, 4 Drawing Sheets

(51) Int. Cl.
 *H02J 7/02* (2016.01)
 *H02J 50/12* (2016.01)
 *H02J 50/70* (2016.01)
 *H02J 17/00* (2006.01)
 *H02J 5/00* (2016.01)
 *H01F 27/36* (2006.01)

(52) U.S. Cl.
 CPC ............. *H02J 17/00* (2013.01); *H02J 50/12* (2016.02); *H02J 50/70* (2016.02)

(56) References Cited

U.S. PATENT DOCUMENTS

| | | | |
|---|---|---|---|
| 2009/0267558 A1 | 10/2009 | Jung | |
| 2010/0065352 A1 | 3/2010 | Ichikawa | |
| 2010/0181842 A1 | 7/2010 | Suzuki et al. | |
| 2010/0320843 A1 | 12/2010 | Kitamura et al. | |
| 2011/0013789 A1 | 1/2011 | Chen | |
| 2012/0242447 A1* | 9/2012 | Ichikawa | B60L 11/182 336/84 C |

FOREIGN PATENT DOCUMENTS

| | | |
|---|---|---|
| JP | H10-94104 A | 4/1998 |
| JP | 2009-004514 A | 1/2009 |
| JP | 2010-070048 A | 4/2010 |
| JP | 2011-120382 A | 6/2011 |
| KR | 10-0900084 B1 | 5/2009 |
| KR | 10-2009-0113418 A | 11/2009 |
| KR | 10-2010-0121644 A | 11/2010 |
| KR | 10-2011-0061874 A | 6/2011 |
| KR | 10-2011-0074272 A | 6/2011 |
| KR | 10-2011-0081516 A | 7/2011 |
| WO | WO-2011/074091 A1 | 6/2011 |

OTHER PUBLICATIONS

International Search Report in International Application No. PCT/KR2012/005419, dated Jul. 9, 2012.
Office Action dated Jan. 31, 2013 in Korean Application No. 10-2011-0074272.
Notice of Allowance dated Jun. 21, 2013 in Korean Application No. 10-2011-0081516.
European Search Report in European Application No. EP 12 81 6941, dated Jun. 4, 2014.

* cited by examiner

[Fig. 1]
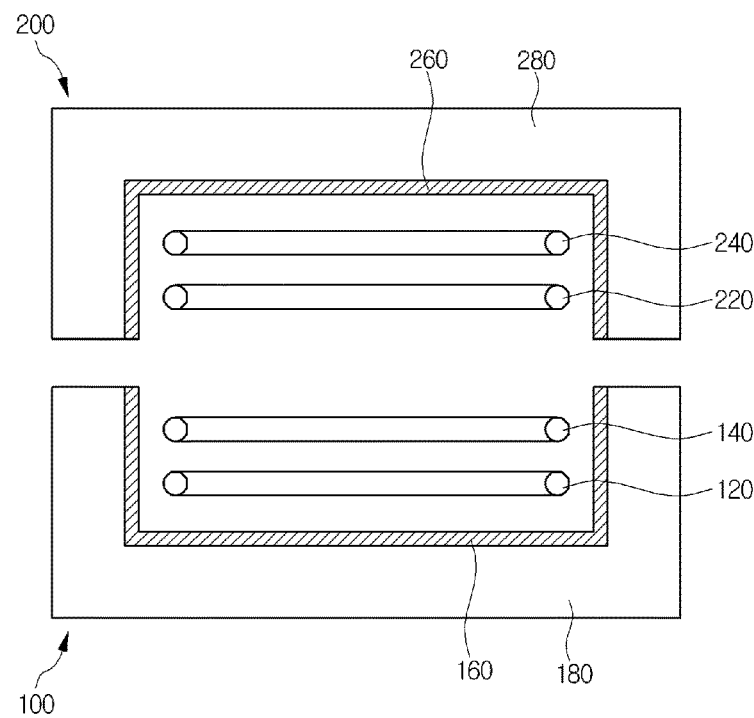
[Fig. 2]
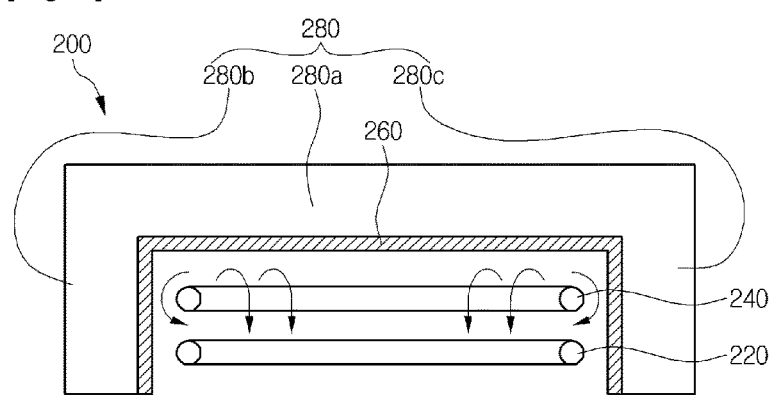
[Fig. 3]
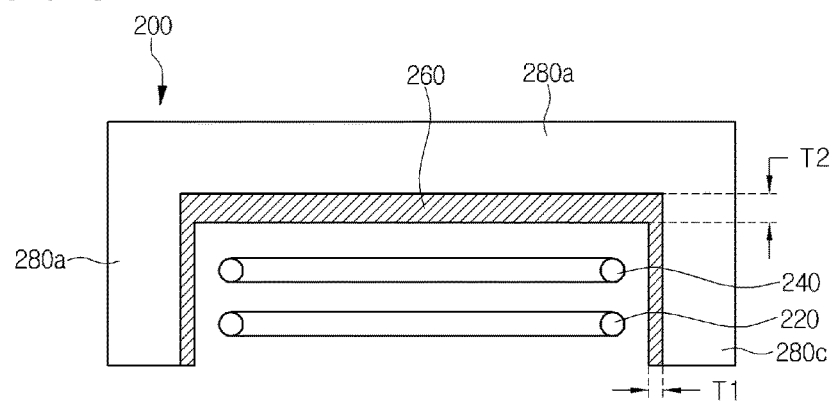

[Fig. 4]
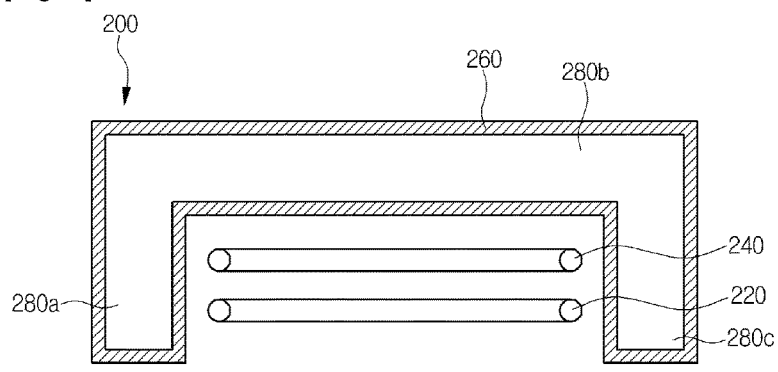
[Fig. 5]
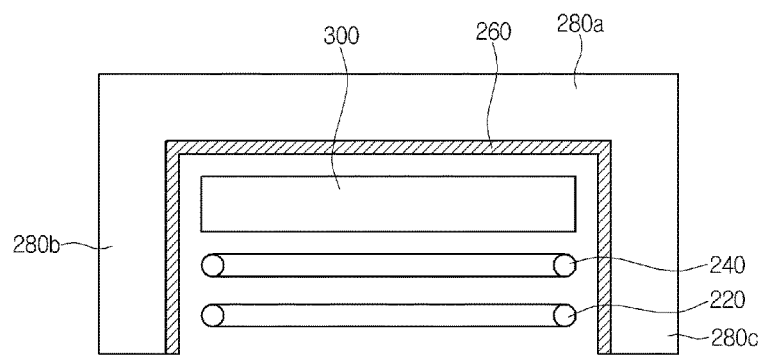
[Fig. 6]
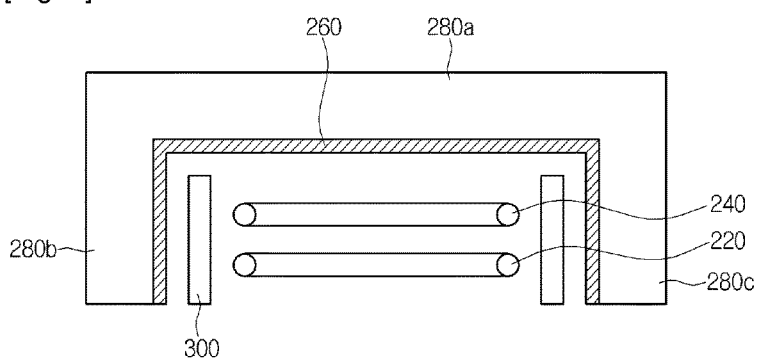
[Fig. 7]
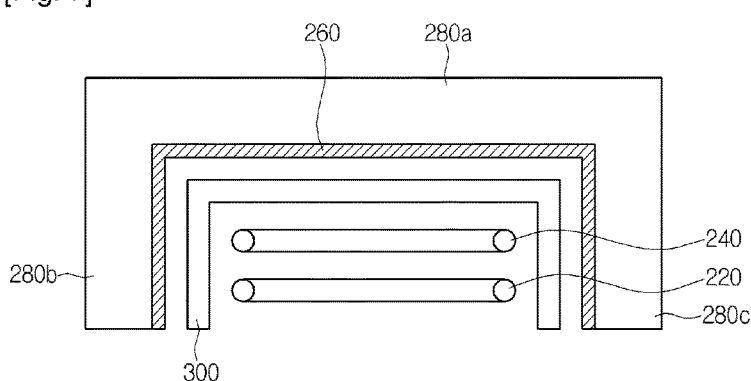

[Fig. 8]
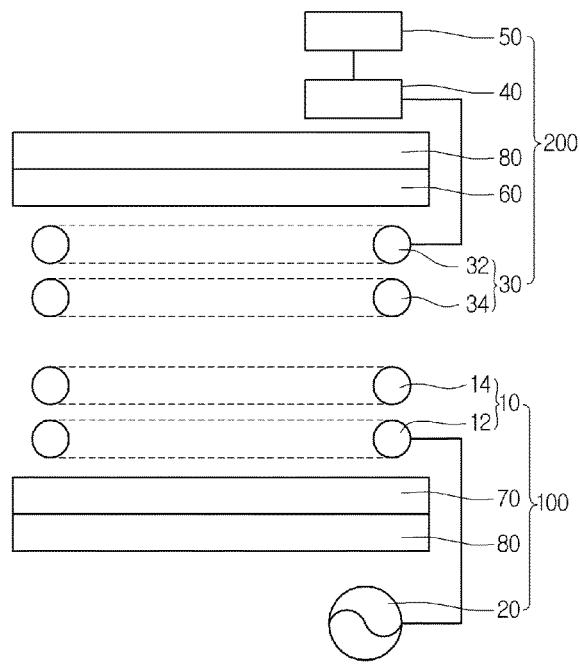
[Fig. 9]
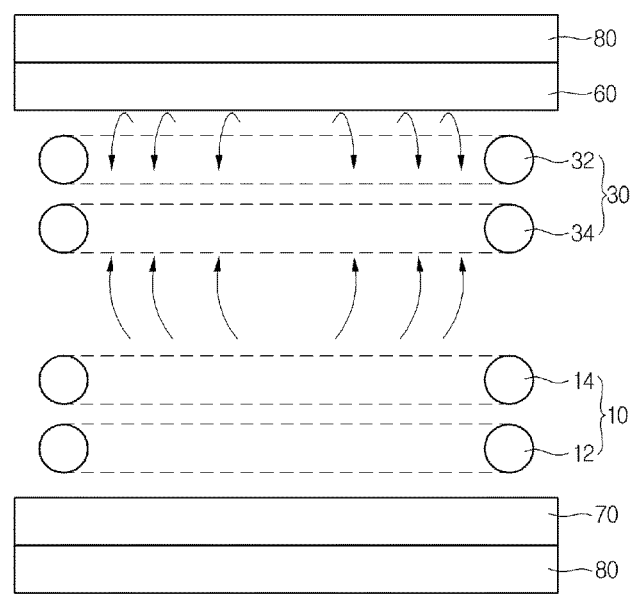
[Fig. 10]
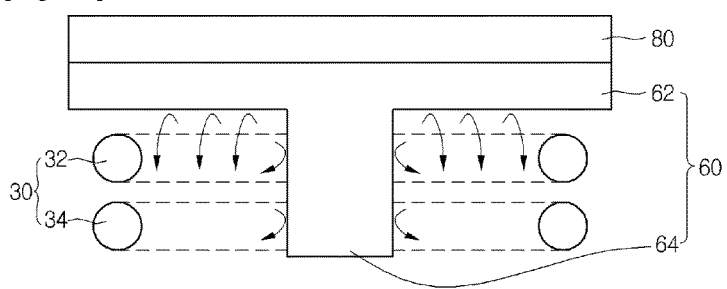

[Fig. 11]
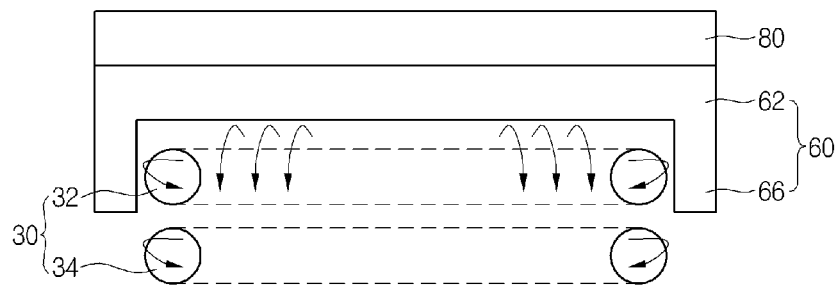
[Fig. 12]
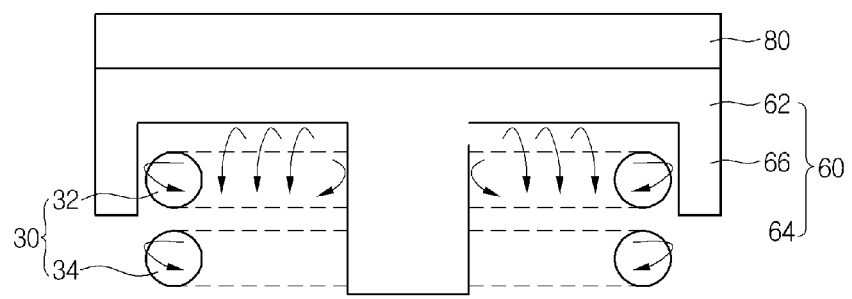

WIRELESS POWER TRANSMITTER AND WIRELESS POWER RECEIVER

CROSS-REFERENCE TO RELATED APPLICATIONS

This application is the U.S. national stage application of International Patent Application No. PCT/KR2012/005419, filed Jul. 9, 2012, which claims priority to Korean Application Nos. 10-2011-0074272, filed Jul. 26, 2011, and 10-2011-0081516, filed Aug. 17, 2011, the disclosures of each of which are incorporated herein by reference in their entirety.

TECHNICAL FIELD

The disclosure relates to a wireless power transmitter and a wireless power receiver. In more particular, the disclosure relates to a technology for improving the power transmission efficiency.

BACKGROUND ART

A wireless energy transfer refers to a technology for wirelessly transferring electric energy to desired devices.

The wireless energy transfer has been used in an electric motor or a transformer employing the principle of electromagnetic induction and then has been adopted in radio waves, electrical toothbrushes or electrical razors.

To this end, power from a transmission coil is transferred to a reception coil and then transferred to a load in a wireless power transmitter.

However, since a plurality of components or a metallic shielding part for shielding the magnetic field is installed in the wireless power transmitter according to the related art, the magnetic flux flowing through the reception coil is absorbed in metallic members, so the transmission efficiency may be lowered.

In addition, if the magnetic flux is absorbed in the metallic members, the metallic members may be heated, thereby causing the defect in components of a receiver.

DISCLOSURE OF INVENTION

Technical Problem

The disclosure provides a wireless power transmitter capable of preventing eddy current from occurring from a metallic member of a receiver.

In addition, the disclosure provides a wireless power transmitter capable of preventing the defect of products by preventing a receiver from being heated.

Solution to Problem

According to one embodiment of the disclosure, there is provided a wireless power receiver for wirelessly receiving power from a wireless power transmitter, the wireless power receiver including a reception coil part resonance-coupled with the wireless power transmitter to receive the power, and an eddy current prevention part disposed at one side of the reception coil part to prevent an eddy current from being generated from the wireless power receiver caused by a magnetic field generated from the reception coil part.

According to another embodiment of the disclosure, there is provided a wireless power transmitter for wirelessly transmitting power to a wireless power receiver, the wireless power transmitter including a transmission coil part resonance-coupled with the wireless power receiver to transmit the power; and an eddy current prevention part disposed at one side of the transmission coil part to prevent an eddy current from being generated from the wireless power transmitter caused by a magnetic field generated from the transmission coil part.

According to still another embodiment of the disclosure, there is provided a wireless power transmission system including a wireless power transmitter for wirelessly transmitting power and a wireless power receiver, wherein the wireless power transmitter includes a transmission coil part resonance-coupled with the wireless power receiver to transmit the power, and a first eddy current prevention part disposed at one side of the transmission coil part to prevent an eddy current from being generated from the wireless power transmitter caused by a magnetic field generated from the transmission coil part, and wherein the wireless power receiver includes a reception coil part resonance-coupled with the wireless power transmitter to receive the power, and a second eddy current prevention part disposed at one side of the reception coil part to prevent the eddy current from being generated from the wireless power receiver caused by a magnetic field generated from the reception coil part.

Advantageous Effects of Invention

According to the embodiment of the disclosure, the eddy current generator is disposed at the rear end of the reception coil part, thereby preventing the eddy current from being generated in relation to the metallic member caused by the magnetic field generated from the reception coil part.

In addition, according to the embodiment of the disclosure, a protrusion is provided at the center of the eddy current prevention part, thereby effectively preventing the eddy current.

According to the embodiment of the disclosure, a plating layer is formed by using zinc, so the corrosion-resistance property can be improved, thereby extending the life span of components.

Further, according to the embodiment of the disclosure, a magnet is further provided between the reception coil part and a metallic shielding part, so the eddy current can be basically prevented.

BRIEF DESCRIPTION OF DRAWINGS

FIG. 1 is a sectional view showing a wireless power transmitter and a wireless power receiver according to the disclosure;

FIG. 2 is a partially sectional view showing a wireless power receiver according to the disclosure;

FIGS. 3 and 4 are sectional views showing modified examples of a wireless power receiver according to the disclosure;

FIG. 5 is a sectional view showing a wireless power receiver provided with a magnet according to the disclosure;

FIGS. 6 and 7 are sectional views showing modified examples of a wireless power receiver provided with a magnet according to the disclosure;

FIG. 8 is a sectional view showing a wireless power transmission system according to one embodiment;

FIG. 9 is a sectional view showing a wireless power transmission system with a flow of a magnetic flux according to one embodiment; and FIGS. 10 to 12 are sectional views showing a wireless power receiver 200 including the structure of an eddy current prevention part according to another embodiment of the disclosure.

BEST MODE FOR CARRYING OUT THE INVENTION

Hereinafter, exemplary embodiments of the disclosure will be described in detail with reference to accompanying drawings.

FIG. 1 is a sectional view showing a wireless power transmitter and a wireless power receiver according to the disclosure, FIG. 2 is a partially sectional view showing the wireless power receiver according to the disclosure, and FIGS. 3 and 4 are sectional views showing modified examples of the wireless power receiver according to the disclosure.

Referring to FIGS. 1 to 4, the wireless power transmitter 100 according to the disclosure includes transmission coil parts 120 and 140, a plating layer 160 and a metallic shielding part 180.

The transmission coil parts may include a transmission induction coil 120 for transmitting power received from a power supplying apparatus and a transmission resonant coil 140 inductively coupled with the transmission induction coil 120 to receive the power through the electromagnetic induction.

The plating layer 160 may be formed at one side of the metallic shielding part 180 disposed at one side of the transmission coil parts.

The plating layer 160 can prevent the eddy current caused by the magnetic field generated from the transmission coil parts. The eddy current refers to the phenomenon in which a circular current is generated in a plane perpendicular to the magnetic flux direction when the magnetic flux is changed in a conductor. The eddy current may generate heat in the conductor and interfere with the flow of the magnetic flux passing through the conductor, thereby degrading the power transmission efficiency.

The metallic shielding part 180 shields the magnetic flux generated from the wireless power transmitter 100, thereby preventing the malfunction of other components and leakage of the magnetic flux.

The wireless power receiver 200 includes reception coil parts 220 and 240, a plating layer 260 and a metallic shielding part 280.

The reception coil parts may include a reception resonant coil 220, which is resonance-coupled with the transmission resonant coil 140 and operates at the resonance frequency the same as that of the transmission resonant coil 140 to receive the power, and a reception induction coil 240 inductively coupled with the reception resonant coil 220.

The plating layer 260 may be formed at one side of the metallic shielding part 380 disposed at one side of the reception coil parts.

The plating layer 260 can prevent the eddy current caused by the magnetic field generated from the reception coil parts.

A power supply apparatus (not shown) may be connected to the transmission induction coil 120 to apply predetermined power to the transmission induction coil 120.

The transmission resonant coil 140 may generate non-radiative electromagnetic waves using the resonance and a variable device (not shown), such as a capacitor, can be disposed at one side of the transmission resonant coil 140 to adjust the resonance frequency.

The power transmission using the resonance is to transmit power between two LC circuits subject to impedance matching, and can transmit power with high efficiency farther than the power transmission by the electromagnetic induction.

An additional variable device (not shown) can be provided in the reception resonant coil 220 to adjust the resonance frequency. The variable device may be provided only at one side of the transmission resonant coil 140 or the reception resonant coil 220.

Although not shown in the drawings, a rectifier (not shown) and a load (not shown) may be further connected to the transmission coil parts 120 and 140.

The rectifier rectifies the power received from the reception induction coil 240 and transfers the rectified power to the load. The load may include a battery or a predetermined device requiring the power.

As described above, the resonance type wireless power transmission scheme, which is the non-radiative energy transfer technology, can transmit power with high efficiency farther than the power transmission by the electromagnetic induction.

In particular, according to the resonance type wireless power transmission scheme, the energy is transferred only when the same resonance frequency is formed, and the remaining energy is re-absorbed, so that the resonance type wireless power transmission scheme, different from electromagnetic waves, may not be hazardous to the peripheral machines or human body.

Meanwhile, the metallic shielding part 280 is provided to prevent the malfunction of various electronic components disposed at the rear end of the reception coil parts 220 and 240 by preventing the magnetic field, which is generated from the reception coil parts 220 and 240, from being transferred to the various electronic components.

The metallic shielding part 280 may be formed by using a metallic material, such as stainless steel, aluminum or copper and may have a plate shape surrounding the rear end and the lateral end of the reception coil parts 220 and 240.

In detail, the metallic shielding part 280 may include a horizontal part 280a disposed at the rear end of the reception coil parts 220 and 240, and first and second vertical parts 280b and 280c, which are bent downward from both ends of the horizontal part 280a to surround both lateral sides of the reception coil parts 220 and 240, respectively.

However, the structure of the metallic shielding part 280 is not limited to the above and the metallic shielding part 280 may be modified to have various shapes according to the embodiments.

Meanwhile, the plating layer 260 may be formed on the surface of the metallic shielding part 280.

The plating layer 260 prevents the eddy current from being generated by the magnetic field generated from the reception coil parts 220 and 240.

The plating layer 260 may be formed by using zinc or aluminum and the plating layer 260 may shield the magnetic field generated from the reception coil parts 220 and 240 to prevent the eddy current.

In addition, if the plating layer 260 includes zinc, the corrosion of the metal, which may be easily ionized, can be prevented, so that the corrosion-resistance property of the metallic shielding part 280 can be improved.

The plating layer 260 can be formed through the electroplating process or the hot dipping process.

According to the electroplating process, the plating layer may be formed with a thin thickness, so the outer appearance of the plating layer can be improved without deformation. Thus, the electroplating process is suitable for small-size components.

In addition, according to the hot dipping process, the plating layer is formed by melting a metal at the high temperature, so the plating layer may have a thick thickness with superior durability. Thus, the hot dipping process is suitable for large-size products used in the outdoors.

Therefore, the fabrication process for the plating layer 260 may vary depending on the size of the metallic shielding part 280 to have the appropriate property and size.

The plating layer 260 extends from the inside of the horizontal part 280a to the sidewalls of the first and second vertical parts 280b and 280c to prevent the eddy current from being generated caused by the magnetic field generated from the reception coil parts 220 and 240. Thus, the eddy current caused by the magnetic field generated from the reception coil parts 220 and 240 can be prevented.

Although it has been illustrated that the metallic shielding part 280 is disposed at one side of the reception coil parts 220 and 240 formed with the plating layer 260, the embodiment is not limited thereto. For instance, the metallic shielding part 280 may be formed at one side of the transmission coil parts 120 and 140. For the purpose of convenience, the following description will be made on the assumption that the metallic shielding part 280 is formed at one side of the reception coil parts 220 and 240.

As shown in FIG. 2, if the power is transmitted from the transmission coil parts 120 and 140 through the resonance scheme, the power is transferred to the reception induction coil 240 through the reception resonant coil 220. At this time, the magnetic field generated while the power is being transmitted to the reception coil parts 220 and 240 may be shielded by the plating layer 260, so that the eddy current may be prevented, thereby improving the power transmission efficiency.

Although it has been described that the plating layer 260 is formed at the inside of the metallic shielding part 280 facing the reception coil parts 220 and 240, the embodiment is not limited thereto, but the plating layer 260 can be variously formed as follows.

As shown in FIG. 3, the plating layer 260 can be formed on one side of the horizontal part 280a and inner sides of the first and second vertical parts 280b and 280c.

At this time, the thickness of the plating layer 260 formed on one side of the horizontal part 280a may be thicker than the thickness of the plating layer 260 formed on the inner sides of the first and second vertical parts 280b and 280c.

If the power is transmitted to the reception coil parts 220 and 240, a greater amount of the magnetic field may be formed at the rear end of the reception coil parts 220 and 240. To solve the above problem, according to the disclosure, the plating layer 260 formed on one side of the horizontal part 280a has a thicker thickness.

Thus, the eddy current, which may be generated by the magnetic field generated from the reception coil parts 220 and 240, can be effectively prevented.

Further, as shown in FIG. 4, the plating layer 260 can be formed on the entire surface of the metallic shielding part 280.

If the plating layer 260 is formed on the entire surface of the metallic shielding part 280, the eddy current generated by the magnetic field generated from the reception coil parts 220 and 240 can be reliably shielded.

Meanwhile, a magnet 300 can be further provided at one side of the metallic shielding part 280 formed with the plating layer 260 in order to prevent the eddy current caused by the electric field.

The magnet 300 may change the direction of the magnetic flux generated from the reception coil parts, thereby preventing the eddy current from being generated from other components caused by the magnetic flux.

FIG. 5 is a sectional view showing the wireless power receiver provided with the magnet according to the disclosure and FIGS. 6 and 7 are sectional views showing modified examples of the wireless power receiver provided with the magnet according to the disclosure.

As shown in FIG. 5, the magnet 300 can be provided within the metallic shielding part 280 of the reception coil parts 220 and 240. In detail, the magnet 300 can be provided at one side of the horizontal part 280a of the metallic shielding part 280 facing the reception induction coil 240.

The magnet 300 may be formed by using a soft magnetic material, such as sendust or ferrite and can effectively prevent the eddy current caused by the magnetic field together with the plating layer 260.

The magnet 300 may be formed at the rear end of the reception induction coil 240 with a large size sufficient for covering the regions where the magnetic field is generated. The magnet 300 may have a size less than 1 mm.

That is, since the eddy current caused by the magnetic field generated from the reception coil parts 220 and 240 can be sufficiently blocked by the plating layer, if the magnet 300 is provided together with the plating layer 260, the eddy current can be effectively prevented with a small thickness.

In addition, as shown in FIG. 6, the magnet 300 can be formed at the lateral side of the metallic shielding part 280 facing the lateral sides of the reception coil parts 220 and 240. In detail, the magnet 300 may be provided between the first vertical part 280b and the reception coil parts 220 and 240. In addition, the magnet 300 may be further provided between the second vertical part 280b and the reception coil parts 220 and 240.

Thus, the eddy current caused by the magnetic field generated from the lateral side of the reception coil parts 220 and 240 can be effectively prevented. The thickness of the magnet 300 may vary depending on the embodiments.

Further, as shown in FIG. 7, the magnet 300 may have a shape surrounding the reception coil parts 220 and 240.

In detail, the magnet 300 may be formed at one side of the horizontal part 280a to surround the rear end of the reception coil parts 220 and 240 and may extend from one side of the horizontal part 280a to one sides of the first and second vertical parts 280b and 280c to surround both lateral sides of the reception coil parts 220 and 240.

Thus, the eddy current caused by the magnetic field generated from the reception coil parts 220 and 240 can be effectively prevented by the magnet 300. In detail, the eddy current generated from the metallic shielding part 280 can be basically prevented by the plating layer 260 disposed at the rear end of the magnet 300.

FIG. 8 is a sectional view showing a wireless power transmission system according to one embodiment and FIG. 9 is a sectional view showing a wireless power transmission system with a flow of a magnetic flux according to one embodiment.

Referring to FIG. 8, the wireless power transmission system according to the disclosure includes a wireless power transmitter 100, a wireless power receiver 200 receiving wireless power from the wireless power transmitter 100, and eddy current prevention parts 60 and 70 for preventing the eddy current of the power received from the wireless power receiver 200.

The wireless power transmitter 100 includes a transmission coil part 10 and a power supply apparatus 20. The power supply apparatus 20 may be provided separately from the wireless power transmitter 100.

The transmission coil part 10 receives power from the power supply apparatus 20 and transmits the power using resonance. The transmission coil part 10 includes a transmission induction coil 12 and a transmission resonant coil 14.

The power supply apparatus 20 is connected to the transmission induction coil 12 to supply predetermined power to the transmission induction coil 12. The power can be supplied from the power supply apparatus 20 to the transmission resonant coil 14 through the electromagnetic induction.

The wireless power receiver 200 may include a reception coil part 30, a rectifier 40 and a load 50.

The reception coil part 30 receives the power, which is wirelessly transmitted from the wireless power transmitter 100 and includes a reception induction coil 32 and a reception resonant coil 34.

The reception resonant coil 34 receives the power transmitted from the transmission resonant coil 14 and the received power is induced through the resonance scheme. An additional variable device can be provided in the reception resonant coil 34 to adjust the resonance frequency. The variable device may be provided only at one side of the transmission resonant coil 14 or the reception resonant coil 34.

As described above, the power induced to the reception resonant coil 34 can be supplied to the reception induction coil 32 through the electromagnetic induction scheme.

The rectifier 40 rectifies the power received from the reception induction coil 32 and transfers the rectified power to the load 50.

The load may include a battery or a predetermined device requiring the power.

As described above, the resonance type wireless power transmission scheme, which is the non-radiative energy transfer technology, can transmit power with high efficiency farther than the power transmission by the electromagnetic induction.

In particular, according to the resonance type wireless power transmission scheme, the energy is transferred only when the same resonance frequency is formed, and the remaining energy is re-absorbed, so that the resonance type wireless power transmission scheme, different from electromagnetic waves, may not be hazardous to the peripheral machines or human body.

Meanwhile, a first eddy current prevention part 60 according to the disclosure is provided at one side of the reception oil part 30.

The first eddy current prevention part 60 may be disposed at the rear end of the reception coil part 30 that receives the power and may have a circular shape or a polygonal plate shape.

The first eddy current prevention part 60 can be formed by using a soft magnetic material, such as sendust or ferrite, to effectively prevent the eddy current from being generated in relation to a metallic shielding member 80 in the receiver.

The first eddy current prevention part 60 may be formed at the rear end of the reception coil part 30 with a large size sufficient for covering the regions where the magnetic field is generated. The first eddy current prevention part 60 may have a size in the range of 1 mm to 2 mm.

If the first eddy current prevention part 60 has a size less than 1 mm, the thickness is too shallow to prevent the eddy current caused by the magnetic field. In addition, if the size of the first eddy current prevention part 60 exceeds 2 mm, the thickness is so thick that the first eddy current prevention part 60 may not be received in the receiver.

In the same way, a second eddy current prevention part 70 can be further provided at one side of the transmission coil part 10.

The second eddy current prevention part 70 may be disposed at the rear end of the transmission coil part 10 and has a material and a shape the same as those of the first eddy current prevention part 60.

As shown in FIG. 9, if the power is transmitted from the transmission coil part 10 using the resonance, the power is transferred to the reception induction coil 32 through the reception resonant coil 34.

At this time, since the second eddy current prevention part 70 is disposed at one side of the transmission induction coil 12, the eddy current caused by the magnetic field can be prevented, so that the power transmission efficiency can be improved.

If the power is transmitted from the transmission coil part 10 to the reception coil part 30 with the high power transmission efficiency, the reception coil part 30 rectifies the power and transmits the rectified power to the load 50.

When the power is transmitted to the reception coil part 30, the eddy current is prevented from being generated in relation to the metallic shielding member 80 by the first eddy current prevention part 60, so the transmitted power can be stably used.

In addition, the magnetic field interference with the metallic shielding member 80 can be prevented so that heat may not be generated from the metallic shielding member 80.

Although it has been described that the eddy current prevention parts 60 and 70 have the plate shape, the disclosure is not limited thereto. For instance, the eddy current prevention parts 60 and 70 may have the shape as shown in FIGS. 10 to 12.

FIGS. 10 to 12 are sectional views showing the wireless power receiver 200 including the structure of the eddy current prevention part according to another embodiment of the disclosure.

As shown in FIG. 10, the eddy current prevention part 60 according to the disclosure may be disposed at the rear end of the reception coil part 30 and may include a plate part 62 and a first protrusion 64.

The second eddy current prevention part 70 can be further provided at the rear end of the transmission coil part with the shape the same as that of the first eddy current prevention part.

The plate part 62 is disposed at the rear end of the first reception coil part 30 and the first protrusion 64 protrudes downward from the center of the plate part 62.

The first protrusion 64 extends by a predetermined length such that the first protrusion 64 can be disposed at the inside of the central portion of the first reception coil part 30. The first protrusion 64 may have various shapes, such as a circular shape or a polygonal shape.

In general, the intensity of the magnetic field flowing through the first reception coil part 30 is higher at the central portion than the peripheral portion of the first reception coil part 30. Thus, if the first eddy current prevention part 60 is disposed inside the reception coil part 30, the eddy current generated from the metallic shielding member 80 can be effectively prevented.

As shown in FIG. 11, the eddy current prevention part 60 according to the disclosure may be disposed at one side of the reception coil part 30 and may include a plate part 62 and a second protrusion 66.

The plate part 62 can be disposed at the rear end of the reception coil part 30 and the second protrusion 66 is formed along the outer peripheral portion of the plate part 62 while extending downward from the plate part 62.

The second protrusion 66 may have a circular shape or a polygonal shape according to the shape of the plate and may surround the lateral side of the reception coil part 30.

Therefore, the eddy current can be prevented from being generated in relation to the metallic shielding member 80 caused by the magnetic field flowing through the lateral side of the reception coil part 30. Thus, the power transmission efficiency can be improved.

As shown in FIG. 12, the eddy current prevention part 60 according to the disclosure may be disposed at the rear end of the reception coil part 30 and may include a plate part 62, a first protrusion 64 and a second protrusion 66.

The first protrusion 64 protrudes toward the lower portion of the plate part 62, so that the first protrusion is disposed inside the reception coil part 30.

The second protrusion 66 is formed along the lower edge of the plate part 62 in such a manner that the second protrusion 66 may surround the lateral side of the reception coil part 30.

In this manner, the first eddy current prevention part 60 prevents the magnetic field in the region between the central portion and the outer peripheral portion of the reception coil part 30 from flowing to the metallic shielding member 80, thereby preventing the eddy current from being generated in relation to the metallic shielding member 80.

Although the first eddy current prevention part 60 has been explained above, the second eddy current prevention part 70 may have the shape the same as those of the first eddy current prevention part 60.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A wireless power receiver for wirelessly receiving power from a wireless power transmitter, the wireless power receiver comprising:
    a reception coil part resonance-coupled with the wireless power transmitter to receive the power;
    a metallic shielding part disposed on the reception coil part for shielding a magnetic field generated from the reception coil part, the metallic shielding part including a horizontal part and first and second vertical parts bent from both ends of the horizontal part, and the reception coil part being disposed between the first and second vertical parts;
    a plating layer including first to third portions that contact an inner surface of the horizontal part and inner side surfaces of the first and second vertical parts; and
    a magnet including a first portion between the first portion of the plating layer and an upper portion of the reception coil part, a second portion between the second portion of the plating layer and a first side of the reception coil part, and a third portion between the third portion of the plating layer and a second side of the reception coil part,
    wherein the plating layer includes zinc, and the magnet includes sendust or ferrite,
    wherein the magnet has a thickness of less than 1 mm,
    wherein the first portion of the plating layer corresponding to the horizontal part is thicker than one of the second and third portions of the plating layer corresponding to the first and second vertical parts, and
    wherein the first to third portions of the magnet are spaced apart from the first to third portions of the plating layer, respectively.

2. The wireless power receiver of claim 1, wherein the plating layer is formed through an electro-galvanizing process or a hot dip galvanizing process.

3. The wireless power receiver of claim 1, wherein the reception coil part comprises:
    a reception resonant coil resonance-coupled with the wireless power transmitter to receive the power; and
    a reception induction coil inductively coupled with the reception resonant coil to receive the power.

4. The wireless power receiver of claim 1, wherein the plating layer is disposed on an entire surface of the metallic shielding part.

5. A wireless power transmitter for wirelessly transmitting power to a wireless power receiver, the wireless power transmitter comprising:
    a transmission coil part resonance-coupled with the wireless power receiver to transmit the power;
    a metallic shielding part disposed on the reception coil part for shielding a magnetic field generated from the reception coil part, the metallic shielding part including a horizontal part and first and second vertical parts bent from both ends of the horizontal part, and the reception coil part being disposed between the first and second vertical parts;
    a plating layer including first to third portions that contact an inner surface of the horizontal part and inner side surfaces of the first and second vertical parts; and
    a magnet including a first portion between the first portion of the plating layer and an upper portion of the reception coil part, a second portion between the second portion of the plating layer and a first side of the reception coil part, and a third portion between the third portion of the plating layer and a second side of the reception coil part,
    wherein the plating layer includes zinc, and the magnet includes sendust or ferrite,
    wherein the magnet has a thickness of less than 1 mm,
    wherein the first portion of the plating layer corresponding to the horizontal part is thicker than one of the second and third portions of the plating layer corresponding to the first and second vertical parts, and
    wherein the first to third portions of the magnet are spaced apart from the first to third portions of the plating layer, respectively.

6. The wireless power transmitter of claim 5, wherein the plating layer is disposed on an entire surface of the metallic shielding part.

\* \* \* \* \*